Patented Apr. 24, 1951

2,549,892

UNITED STATES PATENT OFFICE 2,549,892

FLUORINATED PROPIONYL HALIDES AND A METHOD OF MAKING THEM

David W. Chaney, Nether Providence Township, Delaware County, Pa., assignor to American Viscose Corporation, Wilmington, Del., a corporation of Delaware No Drawing. Original application June 28, 1946, Serial No. 680,055. Divided and this application June 4, 1948, Serial No. 31,205

7 Claims. (Cl. 260—544)

This invention relates to acyl chlorides and fluorides derived from fluorinated propylenes of the formula $$CF_2XCX=CCl_2$$

in which X is selected from the group consisting of fluorine and chlorine.

This application is a division of my pending application Serial No. 680,055, filed June 28, 1946, now Patent No. 2,456,768.

The new acyl chlorides of the invention are obtained by oxidizing the propylene under actinic radiation and in the presence of an oxidation catalyst to produce the corresponding fluorinated propionyl chloride or in some cases, depending upon the starting propylene, a mixture comprising a fluorinated propionyl chloride and a fluorinated propionyl fluoride.

The fluorinated acyl chloride or mixed acyl chloride and acyl fluoride are useful for various purposes. For example, the fluorinated halide may be hydrolyzed to the corresponding acid which, in the form of its sodium salt is useful as an insecticide.

All the halides may be employed as intermediates for the production of other valuable derivatives, as solvents, etc. The halides may be used as intermediates in the production of nitriles which are, in turn, suitable for the production of fluorinated acrylonitriles which form ethers by direct addition of an alcohol to the double bond.

The acyl halides may be separated from the oxidation product, or they may be converted to other derivatives without such sepaartion.

The selected propylene utilized as starting material may be oxidized by passing a stream of oxygen, preferably mixed with a small amount of chlorine gas which serves as a catalyst for the reaction, into a reaction vessel containing the fluorinated propylene and equipped with suitable stirring means and a source of internal actinic radiation, such as a mercury vapor lamp encased in a quartz tube extending into the vessel. The gas is passed in until the acyl halide is formed, as indicated by a marked decrease in the gas absorption rate, generally for a time varying from 50 hours to about 120 hours, depending upon the propylene being oxidized and on the prevailing conditions such as the efficiency of stirring, the concentration of chlorine, and the intensity of the radiation.

The temperature at which the oxidation is conducted may vary somewhat, depending upon the boiling point of the propylene being oxidized and the solubilities of the gases therein, which decrease with increasing temperature, but is preferably maintained within the range of from about 30° to 80° C., the reaction vessel being externally cooled to dissipate the heat of the actinic radiation source.

The reaction of oxygen with the propylenes of the type under consideration apparently results in the formation of an intermediate oxide of the general formula

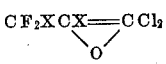

where X has the same significance as above, which by rearrangement involving a shift of a halogen atom from one carbon to another, is converted to the corresponding acyl halide. Most unexpectedly, this shift of a halogen atom and rearrangement to form the acid halide takes place, in the case of the propylenes under consideration, not only with respect to chlorine, but under the conditions described herein, with respect to the perhalogenated methyl group. Thus, when 1,1,3-trichloro-2,3,3-trifluoro-propene-1 ($CF_2ClCF=CCl_2$) is oxidized, the oxidation product comprises both the acid chloride ($CF_2ClCFClCOCl$) and the acid fluoride ($CF_2ClCCl_2COF$), the former due to a shift of a chlorine atom, the latter due to a shift of $CF_2Cl$, the rearrangement taking place according to the following scheme:

*First step—oxidation*

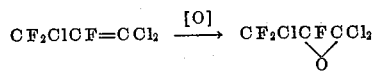

*Second step—rearrangement*

(1) Shift of chlorine

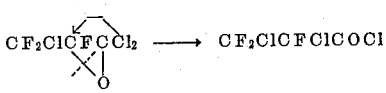

(2) Shift of substituted methyl group

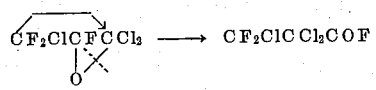

The oxide or mixture of oxides present in the reaction product may be converted to the acyl chloride or mixture of acyl chloride and acyl fluoride by treatment with an amine such as pyridine or, in the case of non-fluorine containing compounds, by treatment with Friedel-Crafts type salts.

Esters may be obtained by refluxing the crude oxidation product with the alcohol corresponding to the ester which it is desired to produce, while the acid amides may be obtained by introducing ammonia into the crude oxidation product.

The following examples in which the parts are by weight will serve to illustrate the invention.

Example I

The apparatus used was a three-neck flask equipped with a stirring device, thermometer, gas inlet, reflux condenser, and a source of internal actinic radiation comprising an 80 watt mercury vapor lamp encased in a quartz tube extending into the flask. About 2,785 parts of 1,1,2,3-tetrachloro-3,3-difluoro-propene-1

$$(CF_2ClCCl=CCl_2)$$

were placed in the flask and a mixture of oxygen and chlorine in a 10:1 ratio was passed into the flask with constant stirring of the flask contents. The temperature was held at 45–60° C., the flask being cooled by means of running water. At the start, the gases were absorbed at a rate of 50 ml./min. After about 20 hours, the absorption rate had dropped to about 10 ml./min. and the reaction was terminated.

The reaction liquid comprises primarily $\alpha$-dichlor-$\beta$-difluoro-chloropropionyl chloride, $$CF_2ClCCl_2COCl$$

and an oxide believed to be

The acid chloride was converted to the ethyl ester by adding the reaction mixture to about 1600 parts of absolute alcohol, with cooling and stirring, the temperature being maintained at about 30° C. The mixture was allowed to stand for about one hour and then poured into 4,000 parts of water. The products which separated as an oil were washed with dilute sodium bicarbonate, then with water, and after drying over sodium sulfate, were fractionally distilled. About 1,670 parts of the ethyl ester of $\alpha$-dichloro-$\beta$-difluoro-chloropropionic acid were obtained, B. P.

170–174° C., $N^{24°} = 1.425$

Example II

In an apparatus similar to that described in Example I, 1160 parts of 1,1,2,3-tetrachloro-3,3-difluoropropene-1 were photo-oxidized, a mixture of ten parts of gaseous oxygen and one part of chlorine gas being passed into the stirred and internally illuminated contents of the flask at a temperature of 50 to 80° C. The reaction was terminated in about 90 hours. The crude oxidation product obtained was diluted with dry ether, and dry ammonia was passed into the mixture. The reaction was exothermic and the mixture was maintained at a temperature below 20° C. by cooling it with ice water, and continuous stirring. The insoluble ammonium salts which precipitated were filtered off and repeatedly extracted with ether. Upon evaporation of the combined ether filtrate and extracts a sticky solid separated which was dried under vacuum. On distillation under vacuum $\alpha$-dichloro-$\beta$-difluoro-chloropropionamide ($CF_2ClCCl_2CONH_2$) was obtained, B. P. 135–148°/29 mm., M. P., 57–58.5° C.

Example III 100 parts of the amide described in Example II in powdered form, were intimately mixed in a flask with 150 parts of powdered phosphorous pentoxide and the mixture was heated to 150–160° C. in an oil bath. The nitrile was distilled off as it formed. At the end of five hours, the temperature was allowed to rise to 210° C. 84 parts of distillate were collected in a receiver cooled by ice, washed with dilute sodium bicarbonate, then with water, dried over sodium sulfate and distilled. All of the product distilled between 91–95° C. A pure sample of $\alpha$-dichloro-$\beta$-difluorochloropropionitrile had a boiling point of 95° C., freezing point −32.5° C., and refractive index $N_D23° = 1.3990$.

Example IV

In an apparatus as described in Example I, 4730 parts of 1,1,3-trichloro-2,3,3-trifluoropropene-1 ($CF_2ClCF=CCl_2$) were photo-oxidized as described in Example I to a mixture consisting primarily of $\alpha$-chlorofluoro-$\beta$-difluorochloropropionyl chloride ($CF_2ClCFClCOCl$), $\alpha$-dichloro-$\beta$-difluorochloropropionyl fluoride $$(CF_2ClCCl_2COF)$$

and an oxide believed to be

The reaction mixture also comprised some unoxidized starting material, some chlorinated product, and by-products resulting from more complete oxidation and degradation, including $COCl_2$, $CO$, and $CF_2ClCOCl$. The temperature during the reaction was maintained at about 35° C. The 10 to 1 mixture of gaseous oxygen and chlorine gas was absorbed at the rate of 300 ml./min. When the absorption rate dropped to about 50 ml./min., which required about 30 hours, the reaction was terminated.

The contents of the flask were then slowly heated to about 50° C. to remove dissolved chlorine gas and low-boiling byproducts.

The acid halides were converted to the corresponding acid esters in the manner described in Example I, that is by adding the crude reaction liquid to absolute ethanol. After fractional distillation, the pure esters were obtained. The ethyl ester of $\alpha$-chlorofluoro-$\beta$-difluorochloropropionic acid had a boiling point of 142° C., refractive index $N_D23°$ 1.3830, and $d23°$ 1.405. The ethyl ester of $\alpha$-dichloro-$\beta$-difluorochloropropionic acid had a boiling point of about 172.5° C., refractive index $N_D23°$ 1.4188 and $d23°$ 1.460.

Instead of ethyl esters, other esters may be obtained by reacting the propionyl halide with the appropriate alcohol, such as methanol, butanol, propanol, etc.

Example V

A crude reaction mixture obtained in accordance with Example IV was diluted with 1500 parts of dry ether, cooled to 10° C., and dry ammonia was passed into the mixture with constant stirring. The reaction between the acid halides and ammonia was exothermic, the temperature being maintained at below 20° C. by external cooling. After about 8 to 10 hours, the acid halides were converted to the corresponding amides and insoluble ammonium halides. The insoluble halides were filtered off, and extracted with ether. The filtrate and ether extracts were combined, and dried, finally under vacuum. 2710 parts of a mixture of amides consisting of $\alpha$-chlorofluoro-$\beta$-difluorochloropropionamide and $\alpha$-dichloro-$\beta$-difluorochloropropionamide were obtained.

Example VI 1000 parts of the amides obtained in accordance with the procedure described in Example V, in finely powdered condition were intimately mixed with 150 parts of powdered phosphorus pentoxide in a round-bottom flask. The mixture was heated to 160–180° C. in an oil bath. At that temperature, the product began to distil over. Heating was continued for about four hours, the temperature being finally raised to 200° C. About 76 parts of crude distillate were obtained. The distillate was washed twice with ice water, dried over anhydrous sodium sulfate, and distilled. At 46–56° C., 22 parts of α-chlorofluoro-β-difluorochloropropionitrile ($CF_2ClCFClCN$) distilled over. B. P. 51.5° C., $N_D23°$ 1.3436, $d23°$ 1.4360. At 90–97° C., 20 parts of α-dichloro-β-difluorochloropropionitrile ($CF_2ClCCl_2CN$), were obtained, B. P. 95.5° C., freezing point—33° C., $N_D23°$ 1.3991, $d23°$ 1.5171.

I claim:

1. A fluorinated propionyl halide of the formula $CF_2ClCClXCOX$, where X is selected from the group consisting of chlorine and fluorine.
2. A fluorinated propionyl chloride of the formula $CF_2ClCCl_2COCl$.
3. A fluorinated propionyl chloride of the formula $CF_2ClCFClCOCl$.
4. A fluorinated propionyl fluoride of the formula $CF_2ClCCl_2COF$.
5. The method for the production of fluorinated propionyl chlorides and fluorides which comprises treating a propylene of formula $$CF_2XCX=CCl_2$$

where X is selected from the group consisting of chlorine and fluorine with oxygen mixed with chlorine gas as an oxidation catalyst under actinic radiation, and isolating the oxidation product.

6. Method for the production of a fluorinated chloride of formula $CF_2ClCCl_2COCl$ which comprises treating a propylene of the formula $$CF_2ClCCl=CCl_2$$

with oxygen mixed with chlorine gas as an oxidation catalyst, under the influence of actinic radiation, and isolating the oxidation product.

7. Method for the production of a mixture comprising a fluorinated propionyl chloride of formula $CF_2ClCFClCOCl$ and a fluorinated propionyl fluoride of formula $CF_2ClCCl_2COF$ which comprises treating a propylene of formula $$CF_2ClCF=CCl_2$$

with oxygen mixed with chlorine gas as oxidation catalyst, under the influence of actinic radiation, and isolating the oxidation product.

DAVID W. CHANEY.

REFERENCES CITED

The following references are of record in the file of this patent:

UNITED STATES PATENTS

| Number | Name | Date |
| --- | --- | --- |
| 2,062,743 | Daudt et al. | Dec. 1, 1936 |
| 2,292,129 | Kirkbride | Aug. 4, 1942 |
| 2,361,552 | Lichty | Oct. 31, 1944 |
| 2,411,982 | Theobald | Dec. 3, 1946 |
| 2,427,624 | Rushmer et al. | Sept. 16, 1947 |
| 2,439,505 | Chaney | Apr. 13, 1948 |
| 2,456,768 | Chaney | Dec. 21, 1948 |

OTHER REFERENCES

Leimu, Berichte, vol. 70B, pp. 1046 and 1049 (1937).